April 20, 1926. Re. 16,332

C. E. KRAUS

AUTOMOBILE BUMPER AND ATTACHING MEANS

Original Filed April 25, 1924

CHARLES E. KRAUS
INVENTOR

BY Louis Ellmer
ATTORNEY

Reissued Apr. 20, 1926.

Re. 16,332

UNITED STATES PATENT OFFICE.

CHARLES E. KRAUS, OF LOUISVILLE, KENTUCKY, ASSIGNOR, BY DIRECT AND MESNE ASSIGNMENTS, OF TWO-THIRDS TO FRED W. KRAUS AND ONE-THIRD TO REUBEN RUTHENBURG, BOTH OF LOUISVILLE, KENTUCKY.

AUTOMOBILE BUMPER AND ATTACHING MEANS.

Original No. 1,537,473, dated May 12, 1925, Serial No. 708,854, filed April 25, 1924. Application for reissue filed March 1, 1926. Serial No. 91,636.

*To all whom it may concern:*

Be it known that I, CHARLES E. KRAUS, a citizen of the United States, residing at Louisville, in the county of Jefferson and State of Kentucky, have invented certain new and useful Improvements in Automobile Bumpers and Attaching Means, and hereby declare the following to be a full, clear, and exact description of the invention, such as will enable others skilled in the art to which it appertains to make and use the same.

This invention relates to improvements in automobile bumpers and attaching means therefor, and has for its object the provision of a bumper or similar protecting impact bar for either the front or rear of automobiles which will be simple of construction, economical to manufacture, and readily applied to an automobile, besides being neat and distinctive in appearance.

One of the principal objects of this invention is the provision in an automobile bumper, of arm support attaching elements whereby the same may be readily affixed to the chassis of an automobile without the necessity of drilling any holes in the side frames, or of making any changes whatsoever in the construction and arrangement of the chassis springs and other parts thereof.

Still another object of this invention is the provision of attaching and supporting elements for automobile bumpers or the like comprising clamp or wedge members which are so constructed as to be readily and conveniently applied to the channeled frame or chassis members of the automobile and which, when applied, will be securely and positively maintained in desired position.

Further objects of my invention will be apparent from the disclosures shown in the accompanying drawings and specification, in which drawings:—

Figure 1:
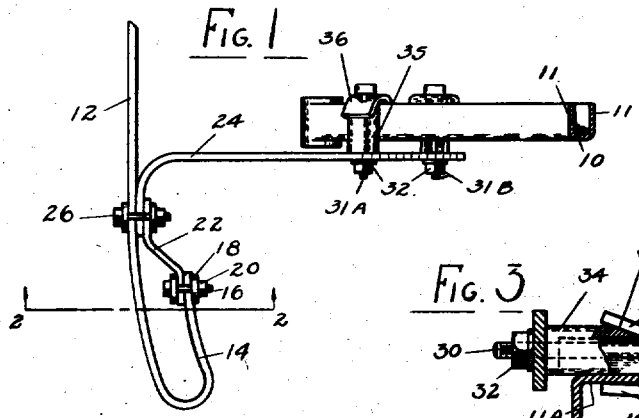
Figure 1 is a top plan view of a half portion of the improved automobile bumper of this invention illustrating the novel attaching means applied thereto and in conjunction with a portion of an automobile side frame or chassis, it being understood that the opposite frame side is intended to be substantially similar to the half portion shown.

In said drawings, the reference numeral 10 indicates generally a portion of an automobile chassis having a side frame of the usual channeled construction and comprising a set of complementary flanges such as 11 of which $11^A$ and $11^B$ designate the respective inner and outer clamping surfaces thereof. A bumper comprising mainly a transversely extending impact bar 12 is adapted to be applied to the chassis or side frame member 10 and, as shown in Figure 1, the ends of the bar 12 are bent rearwardly and thence inwardly to form a rounded end, the inwardly extending portion as illustrated at 14 being substantially parallel to the main portion of the bar 12.

A suitable opening is provided in the end of the inwardly bent portion 14 and through this opening is passed a bolt 16 provided with suitable washers 18 and a retaining nut 20 which bolt also passes through a corresponding opening in a short member 22 formed in a zigzag shape as illustrated in Figure 1, having its other end adapted to cooperate with a section of the main bar 12.

Fitted between the inner end of the zigzag member 22 and a cooperating portion of the main bar 12, is the end of an extending arm 24 adapted to support the bumper impact bar in position. Suitable retaining means in the form of a bolt 26 are provided at this point and the bolt passes through respective openings in the end of the member 22, the outer end of the supporting bracket element 24 and through the main bar 12.

Figure 2:
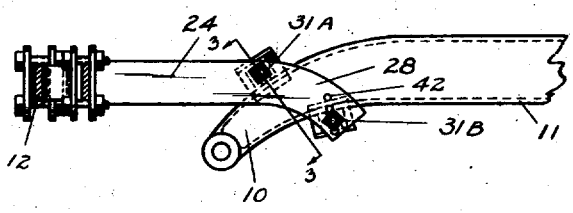
Figure 2 is a side view of the device as illustrated in Figure 1, portions being shown in section and taken along the line 2—2 of Figure 1.

The rearward end of the supporting arm or extending member 24 is preferably bent downwardly and disposed adjacent the web side of the side frame channel as illustrated at 28 in Figure 2. Said rear arm section is preferably disposed across the plane of the spaced channel flanges and each such flange is equipt with oppositely disposed clamping devices respectively provided with an adjusting wedge bolt, the arm being fitted with a number of drilled holes to engage therewith. One of these holes may be provided at a point closely approximating the beginning of the downwardly bent portion 28 and is adapted for the reception of a bolt means 31 such as is indicated in Figures 1 and 2, which bolt may be fitted with a retaining nut 32 and a wedge element 35, the preferred construction of which is best illustrated in detail by Figure 4.

The downwardly extending portion 28 of the supporting element 24 is further fitted with a series of adjacent openings like those shown at 42 in Figure 2 and through any one of these openings a bolt such as $31^B$ is adapted to selectively pass and this bolt is suitably fitted with a wedge and flange clamping element, all of which will presently be further described in connection with the similar bolt 31. It will be evident that the positioning of the bolt $31^B$ in any one of the series of holes 42 will result in a corresponding raising or lowering of the impact bar 12 about the fulcrum bolt $31^A$ whereby the height and relation of the bumper with respect to the automobile may be accurately adjusted if desired.

Figure 6:
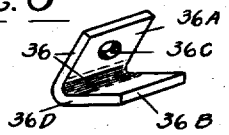
Figure 6 is a detail perspective view illustrating the preferred V shaped attaching clamp plate as shown in Figure 4.
Figure 4:
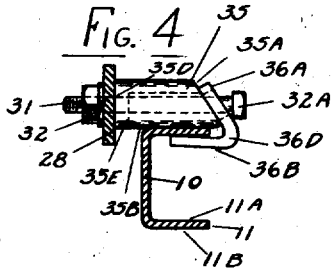
Figure 4 is a sectional view taken on the line 3—3 of Figure 2, looking in the direction indicated by the arrows.

As illustrated in Figs. 4 and 6, a V shaped clamp plate is intended to cooperate with a suitable wedge means and the divergent legs of said plate are respectively designated as $36^A$ and $36^B$. One such leg is disposed to reach beneath and extend inward of the edge region of one of the channel flanges 11 to engage its inner surface such as $11^A$, while the other plate leg is set on an incline and disposed outwardly relative to the outer flange surface $11^B$ and form an acute angle therewith.

Interposed within said divergent legs is the wedge member 35 equipt with a beveled face $35^A$ slidably fitted to the adjacent plate side of the overhung leg $36^A$; said wedge also has a complementary horizontal wedge face $36^B$ adapted to adjustably ride upon said outer flange clamping surface $11^B$. Opposite the beveled end of said wedge member there is further provided a vertical abutment face $35^D$ adapted to adjoin the support arm or plate 28. The wedge 35 is preferably provided with a recess $35^B$ partially extending lengthwise thereof for the reception of the clamp bolt 31 as indicated by dotted lines. The inclined plate leg $36^A$ has an aperture $36^C$ of a size that is considerably larger than the diameter of the bolt shank which passes therethrough. The bolt 31 is equipt with an enlarged rectangular head piece or stop portion bearing upon the outer plate side of said apertured clamp leg which head is designed to allow of limited slip along the leg incline and to prevent turning while the bolt nut is being manipulated. The rear support arm section 28 is preferably mounted upon the threaded end of the bolt 31 and disposed against the abutment face $35^D$. When therefore the clamp bolt is snugly drawn up by its nut 32, it will properly secure the arm and at the same time serve to draw the wedge 35 toward the crotch $36^D$ of said V shaped clamp plate.

Said clamp plate 36 is preferably made of slightly flexible or somewhat springy material such as is afforded the use of high carbon steel plate or the like, possessing a certain inherent resiliency. It is also pointed out that the acute angle of divergence initially formed between the plate legs $36^A$ and $36^B$ is preferably made somewhat smaller than that given to the beveled face $35^A$ as measured with respect to its bottom wedge face $36^B$. This improved disposition of the coacting clamp members causes the extreme end of the underslung plate leg $36^B$ to first bear against the inner flange surface $11^A$ while the remainder of said leg and especially that portion adjacent to the clamp crotch, is initially made to stand off and spring away from said flange surface. The drawing up of the wedge 35 will further cause the clamp legs to be spread apart somewhat and make their divergence conform to the larger angle given to said wedge bevel, thereby closing the initial gap betweent the leg $36^B$ and the flange surface $11^A$ and moving the resultant clamp load near to the crotch $36^D$. As a result, a well distributed and a slightly yielding tight grip pressure will be brought to bear upon both the inner and outer flange surfaces $11^A$ and $11^B$. The described V flange clamp device offers a further important advantage in that its inclined plate leg $36^A$ bears directly upon and is evenly reenforced by the beveled wedge face $35^A$; hence the clamp plate 36 need not be made excessively heavy and may safely be given the required degree of resiliency without suffering from abnormal deflection or otherwise unduly straining the clamp material.

Figure 3:
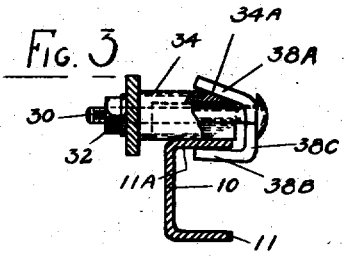
Figure 3 is a sectional view, similar to Figure 4 but illustrating a modification of the invention.
Figure 5:
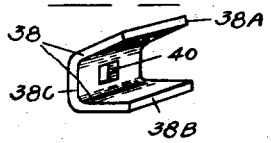
Figure 5 is a detail perspective view illustrating the modified U shaped attaching clamp plate as shown in Figure 3.

A modified clamping device is illustrated in Figs. 3 and 5, where the clamping plate 38 is formed into a U shaped member comprising a yoke element $38^C$. This yoke is provided with a squared aperture 40 which in this instance is intended to snugly receive the squared shank portion of a carriage bolt 30 in the fashion shown. It will be observed that said yoke is subjected to direct bending action as an unsupported beam span and that this modified arrangement does not take care of the bolt load to the same advantage as is afforded by the V shaped clamp previously described. However, the flexible clamp plate 38 may likewise be equipt with an underslung leg 38[B] adapted to grip the inner flange surface 11[A] and an inclined leg 38[A] which slidably engages the bevel face 34[A] of the modified wedge 34, the plate leg 38[B] being initially offset and properly shaped to cause its extreme end to first contact with the inner channel flange surface. It will be evident that the yielding clamping effect produced by drawing up the wedge adjusting bolt 30 will then be substantially identical with that afforded by the preferred clamp device shown in Figure 4.

The herein disclosed automobile bumper is of simple yet strong and durable construction composed of a minimum of parts not likely to work loose, rattle, or get out of order. Furthermore, the attaching means particularly provide an improved and effective method for positively affixing the bumper to an automobile chassis without the use of any special tools and without the necessity of drilling holes or otherwise inserting special fastening elements into the automobile frame parts.

The described resilient fashion of attaching bumper bracket arms to a chassis frame flange, allows my improved clamp to readily accommodate itself to surface irregularities and facilitates the holding of a tight grip upon such channel flanges. Should the bumper impact bar suddenly strike an obstruction or otherwise be called upon to perform its intended function in collision or similar emergency, the flange clamp might thereby be forced to slip back against a virtually sustained grip resistance but the resulting absorption work will then correspondingly exert a strong retarding effect in lessening the shock imposed by the moving car parts.

I am aware that many changes may be made in the described embodiment of my invention and the details of construction varied throughout a wide range without departing from the underlying principles of this invention, and I therefore do not purpose limiting the patent granted hereon otherwise than as necessitated by the prior art.

Claims:

1. An automobile bumper, including in combination, a transversely extending bar, each end of said bar being bent rearwardly and thence inwardly in parallel relation to the main portion of said bar, bracing elements affixed to the end of each of said inward extensions, each of said bracing elements comprising a member having offset ends, one of said ends attached to said inwardly extending end and the other end adapted to cooperate with the main portion of the bumper bar, and means cooperating with the bracing elements for attaching the bumper to an automobile.

2. An automobile bumper, including in combination, a transversely extending bar, each end of said bar being bent rearwardly and thence inwardly in parallel relation to the main portion of said bar, a bracing element affixed to the free end of said inward extension, said bracing element comprising a member having offset ends, one of said ends attached to said inwardly extending end and the other end adapted to cooperate with the main portion of the bumper bar, and means for attaching the bumper to an automobile, said means comprising a support member affixed to the bumper at the junction of the aforesaid bracing means with the bumper.

3. In an automobile bumper, a support, means for attaching the same to a chassis, including angle shaped clamping members adapted to cooperate with the channel frame of said chassis, and means for mounting said angle shaped members on the bumper support, said means comprising shackle bolts passing through the support and said angle members, sleeves surrounding the shanks of said bolts, and inclined faces on the ends of said sleeves adapted to cooperate with the aforesaid angle shaped clamping members.

4. In bracket fastening means for attaching a vehicle bumper to a chassis of which the frame is equipt with an overhung flange having complementary clamping surfaces, a bumper supporting arm; a V shaped clamp plate having divergent leg portions of which one such leg engages the edge region of one flange surface while the other leg is apertured and has both of its plate sides disposed in a common inclined relation to the complementary surface of said flange; an interposed wedge member having one face adjustably mounted upon said complementary flange surface and a beveled face slidably engaging the adjacent plate side of said inclined leg and adapted to reenforce said leg in the region of the aperture; clamping means extending through the beveled face of said wedge member and also said leg aperture to engage the opposite plate side of said inclined leg, said means being adapted to draw said wedge toward the crotch of said V plate and bring a tight clamp grip to bear upon both surfaces of said flange; and means for mounting the bumper arm upon said bolt and securing the same thereto.

5. In bracket fastening means for attaching a vehicle bumper to a chassis of which the frame is equipt with an overhung flange having complementary surfaces, a V-shaped clamp plate having divergent leg portions of which one such leg engages the edge region of one flange surface while the other plate leg is apertured and has both of its plate sides disposed in a common inclined relation to the complementary surface of said flange; an interposed wedge member having one face adjustably mounted upon said complementary flange surface and a beveled face slidably engaging the adjacent plate side of said inclined leg and adapted to reenforce said leg in the region of its aperture, said wedge being further provided with an abutment face; a clamping bolt having a shank extending through the beveled face of the wedge and also said leg aperture and further having a headed portion adapted to bear against the opposite plate side of said inclined leg; a bracket arm adjoined to said wedge abutment face and serving to support said bumper, said arm having a hole therethrough to receive the bolt shank; and nut means thrusting against the arm and engaging the free end of said bolt shank serving to draw said wedge toward the crotch of said V plate and bring a tight yielding clamp grip to bear upon both surfaces of said channel flange.

6. In a vehicle bumper in combination with chassis side frames of which each is equipt with an overhanging flange having complementary clamping surfaces, a bumper supporting arm; a V-shaped clamp plate having divergent leg portions of which one such is disposed to extend inward for engagement with the edge region of one flange surface while the other leg is apertured and has both of its plate sides disposed in a common inclined overhung relation to the complementary surface of said flange; a wedge having convergent faces substantially corresponding to the angle of divergence of the clamp plate legs, said wedge being interposed between the adjacent side of said overhung inclined leg and said complementary flange surface; a clamping bolt having a shank extending through one face of the wedge and also said aperture of the inclined leg, said shank having a stop abutting the opposite plate side of said inclined leg and also a stop outside of the wedge member at the opposite end of said bolt, one of said stops being a nut whereby said wedge may be drawn toward the plate crotch and said three parts, namely the clamp plate, wedge and bolt are made to bring a tight clamp grip to bear upon both surfaces of said channel flange; and means for mounting the bumper support arm upon said bolt and securing the same thereto.

7. In a vehicle bumper in combination with chassis side frames of which each is equipt with an overhanging flange having complementary clamping surfaces, a bumper supporting arm; a V shaped clamp plate having divergent leg portions of which one such is disposed to extend inward for engagement with the edge region of one flange surface while the other leg is apertured and has both of its plate sides disposed in a common inclined overhung relation to the complementary surface of said flange; a wedge having convergent faces corresponding to the angle of divergence of the clamp plate legs, said wedge being interposed between the adjacent side of said overhung inclined leg and said complementary flange surface; a clamping bolt having a shank extending through one of the faces of the wedge and also said aperture of the inclined leg, said shank having a headed portion adapted to engage the opposite plate side of said inclined leg and co-acting therewith to prevent turning of the shank and further having nut means for the free end of said shank adapted to draw said wedge toward the crotch of said V plate to bring a tight yielding clamp grip to bear upon both surfaces of said flange; and means for mounting the bumper support arm upon said bolt and securing the same thereto.

8. In a vehicle bumper in combination with chassis side frames of which each is equipt with an overhanging flange having complementary surfaces, a bumper supporting arm; a flexible V-shaped clamp plate having divergent leg portions of which one such is disposed to extend inward for gripping engagement with the edge region of one flange surface while the other leg is apertured and has both of its plate sides disposed in an inclined overhung relation to the complementary surface of said flange; a wedge equipt with convergent faces initially having an angle of divergence that is somewhat smaller than that between the clamp plate legs, said wedge being interposed between the adjacent side of said overhung inclined leg and said complementary flange surface; a bolt extending through the wedge and said aperture of the inclined leg, said bolt having a stop abutting the outer face of said inclined leg and also a stop outside of the wedge member at the opposite end of said bolt, one of said stops being a nut whereby said clamp plate legs may be sprung apart while the wedge is being drawn toward the plate crotch to bring a tight and substantially distributed yielding grip to bear along the engaged surface in said edge region of said one flange; and means for mounting the bumper support arm upon said bolt and securing the same thereto.

9. In fastening means for attaching a vehicle bumper arm to a chassis side frame beam of channel shaped cross-sectional profile having a pair of flanges inter-connected by a web, said means comprising a pair of clamp devices disposed to grip the respective spaced flanges of said channel and each such device comprising a flexible V shaped clamp plate having divergent leg portions of which one such leg engages the edge region of one of the inner flange surfaces while the other leg thereof is apertured and has both of its plate sides disposed in a common inclined overhung relation with respect to the complementary outer surface of said one flange; an interposed wedge member having a face adjustably mounted upon said outer flange surface and also a beveled face adapted to fit and slidably engage the adjacent plate side of said inclined leg; clamping means extending through both the wedge member and said leg aperture to engage the opposite plate side of said inclined leg, said means being adapted to draw said wedge toward the crotch of said V plate and spring apart the legs thereof to bring a tight yielding fit to bear upon both sides of the aforesaid one flange; a bumper arm of which one end portion is secured to the bumper and the other end thereof is disposed across the planes of the respective channel flanges, said other arm end being provided with a hole to receive the wedge bolt clamping one of said flanges and also with hole means for selectively engaging the wedge bolt clamping the other of said flanges; and means for locking the bumper arm upon said pair of spaced wedge bolts.

In testimony whereof I affix my signature.

CHARLES E. KRAUS.